United States Patent Office 3,492,347
Patented Jan. 27, 1970

3,492,347
PREPARATION OF OPTICALLY ACTIVE
α-METHYL-PHENYLALANINE DERIVATIVES
John M. Chemerda, Watchung, Plainfield, and Meyer Sletzinger, North Plainfield, N.J., assignors to Merck & Co., Inc., Rahway, N.J., a corporation of New Jersey
No Drawing. Filed Apr. 29, 1964, Ser. No. 363,586
Int. Cl. C07c *101/42*
U.S. Cl. 260—519
23 Claims

ABSTRACT OF THE DISCLOSURE

A process is described wherein an α-halo-α-(3,4-disubstitutedbenzyl)propionic acid is resolved by a known means into its L- and D- forms. Each of the isomers is then converted to L-α-methyl-(3,4-disubstitutedphenyl)alanine respectively by treatment with ammonia solutions or with anhydrous ammonia. The 3 and 4 substituents which are either hydroxy or hydrolyzable to hydroxy are then hydrolyzed either with mineral acid or with aluminum chloride to produce α-methyl-β-(3,4-dihydroxyphenyl)alanine.

---

This invention relates to a process for the preparation of phenylalanine compounds of the L or sinister spatial configuration. More particularly, it relates to a process for the preparation of the L form of α-methyl-3,4-disubstitutedphenylalanines substantially free of its D form by the resolution of the corresponding α-halo acid and subsequent synthesis of the optically active α-amino acid. Still more particularly, it relates to a process for the preparation of L α-methyl - (3,4 - dihydroxyphenyl)-alanine and the non-toxic salts thereof.

It is known that α-methyl - (3,4-dihydroxyphenyl)-alanine and its salts are of value as antihypertensive agents. It is further known that the therapeutic activity of these compounds resides solely in the L or sinister spatial configuration. In addition, the D form, while therapeutically inert, is just as toxic as the L form. Consequently, the removal of the D form will enable the administration of a safer drug with the same therapeutic activity as the DL form, but with ½ the bulk and toxic effect. We have found that a DL α-halo-α-(3,4-disubstitutedbenzyl)-propionic acid may be resolved into its L and D forms and that both forms can subsequently be converted to the desired L α - methyl - (3,4-dihydroxyphenyl)-alanine compounds, thus obtaining the L compounds substantially free of the D forms in a novel, efficient, and unexpected manner.

In accordance with the process of this invention (Flow Sheet II), the starting material, DL α-halo-*a*-(3,4-disubstitutedbenzyl)-propionic acid, is resolved by any known means. Both the L α-halo and D α-halo acids can be subsequently used to prepare the final L α-methyl-(3,4-dihydroxyphenyl) - alanine compounds. The resolved D α-halo-α-(3,4-disubstitutedbenzyl) - propionic acid compound obtained from the resolution is reacted with ammonia, the excess ammonia evaporated, and the residue treated with a dilute aqueous mineral acid to obtain the L α-methyl - (3,4 - disubstitutedphenyl)-alanine mineral acid salt. The resolved L α-halo acid is reacted with a mixture of ammonia and water or ammonia and lower alkanol instead of ammonia alone (as with the D α-halo acid) and subsequently reacted with a dilute mineral acid to obtain the L α-methyl-(3,4-disubstitutedphenyl)-alanine mineral acid addition salt. The treatment of the resolved compounds with dilute acid is used when the starting α-halo compound is the 3,4-dihydroxy compound or when the 3,4-disubstituted compound other than the dihydroxy is desired.

In those cases wherein at least one of $R_1$ and $R_2$ is other than hydrogen, one of the subsequently described dealkylation procedures must be used. (1) The reaction mixture, after ammonolysis of either the D or L α-halo acid, is concentrated to a residue and reacted with a strong aqueous hydrohalic acid at elevated temperatures to obtain the L α-methyl-(3,4-dihydroxyphenyl)-alanine acid addition salt. The reaction products of both the D and L α-halo acid may be combined, if desired, after ammonolysis and subsequently reacted with the acid solution. To obtain the corresponding free acid of the L α-methyl-(3,4-dihydroxyphenyl)-alanine salt, the salt is reacted with a lower alkylene oxide or cautiously neutralized. (2) Alternatively, the residue obtained from the ammonia reaction of both the D and/or L α-halo acid compounds indicated above may be reacted with an organic acid anhydride or halide to obtain the N-acyl L α-methyl - (3,4-disubstitutedphenyl)-alanine compound. Reaction of this N-acyl compound with an aluminum halide and subsequent hydrolysis with a mineral acid yields the L-α-methyl-(3,4-dihydroxyphenyl)-alanine acid salt. The free acid of these salts may also be prepared as indicated above.

The starting DL α-halo-α-(3,4 - disubstitutedbenzyl)-propionic acid may contain a hydroxy and/or methoxy group in the 3,4-position, while the α-halo may be chloro or bromo. It is preferred, however, to use DL α-chloro-α-(3-methoxy-4-hydroxybenzyl) - propionic acid as the starting material. The starting material may be prepared (Flow Sheet I) by diazotization of the appropriate 3,4-disubstituted phenylamine and reaction of this diazotized material with methyl methacrylate in the presence of $CuCl_2$ to obtain the DL α-halo-α-(3,4-disubstitutedbenzyl)-propionic acid methyl ester. This ester is subsequently hydrolyzed in any known manner to the starting free acid.

It is to be noted that when the starting material is the α-halo-α-(3,4-dihydroxybenzyl)-propionic acid compound, neither dealkylation nor the alternative process of acylation and aluminum halide treatment is required. The reactions with concentrated acid or with aluminum halide are used when dealkylation is required so as to obtain the 3,4-dihydroxy compounds.

The following Flow Sheets (I and II) represent the preparation of the starting materials and the process for the preparation of the L phenylalanine compounds respectively.

FLOW SHEET I

Preparation of starting materials

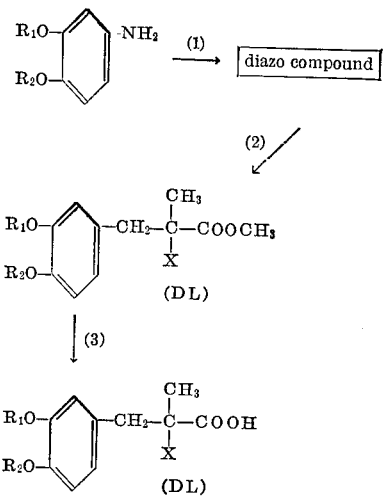

FLOW SHEET II

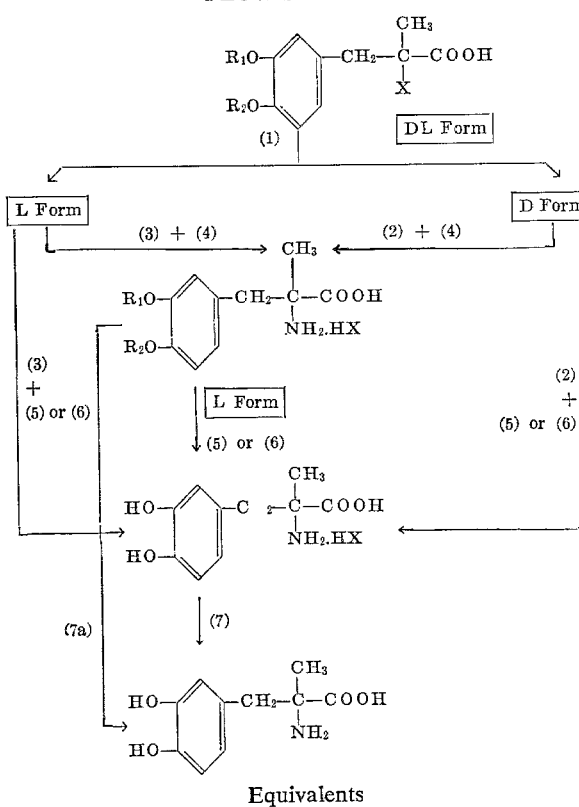

Equivalents $R_1$ and $R_2$ may each be hydrogen or methyl; X may be chloride or bromide.

Reactions and conditions

Step 1.—Resolution by any known means.

Step 2.—Reaction with substantially pure ammonia at any suitable temperature until replacement of the halo is substantially complete, followed by evaporation of the excess ammonia.

Step 3.—Reaction with a solution of ammonia-water or ammonia-lower alkanol (methanol, ethanol, butanol, and the like) until replacement of the halo is substantially complete, followed by evaporation of the excess ammonia.

Step 4.—Reaction of the product from step (2) or (3) with a dilute mineral acid.

Step 5.—Acylation of product 2 or 3 (such as by addition of an alkanoic acid anhydride, alkanoic acid halide, ar-alkanoic acid anhydride, or ar-alkanoic acid halide, and the like), subsequent addition of an aluminum halide, and reaction with a dilute mineral acid.

Step 6.—Addition of the product from step (2) or (3) to a concentrated aqueous hydrohalic acid (such as hydrochloric acid, hydrobromic acid, and the like), preferably above 20% hydrochloric acid, but especially fortified hydrochloric acid (35–45%) in a sealed tube at elevated temperatures, preferably above 125° C., but especially 145–165° C., until cleavage is substantially complete.

Step 7.—Reaction with a lower alkylene oxide or an inorganic base in an inert solvent at any suitable temperature until the reaction is substantially complete. The lower alkylene oxide may be ethylene oxide, propylene oxide, butylene oxide, and the like. The inorganic base may be sodium carbonate, potassium hydroxide, $NH_3$, and the like, preferably a lower alkylene oxide and especially propylene oxide. The inert solvent (inert to the reaction) may be lower ketones (acetone, butyl ketone, ethylpropyl ketone, and the like), ethers (diethyl ether, ethylmethyl ether, dipropyl ether, and the like), and lower alkanols (ethanol, methanol, propanol, and the like), preferably acetone or sec-butanol, but especially acetone. It is also preferred (when using the oxides) that any water remaining from step (4) be removed prior to this step. In the case of neutralization, aqueous solvents are used. The temperature of the reaction is not critical and may vary from zero to the boiling point of the solvent, preferably 5–35° C., but especially ambient temperatures.

Step 7a.—Same as step (7) when $R_1$ and $R_2$ are each hydrogen.

In step (1), the resolution of the α-halo disubstituted-benzyl propionic acid can be carried out by a vast number of known methods. Thus, some racemic mixtures can be precipitated as eutectics instead of mixed crystals and can thus be quickly separated and, in such cases, can sometimes be selectively precipitated. The more common method of chemical resolution is, however, greatly preferred. By this method, diastereomers are formed from the racemic mixture by reaction with an optically active resolving agent. Thus an optically active base can be reacted with the carboxyl group of the above-mentioned propionic acid. The difference in solubility between the diastereomers formed permits the selective crystallization of one form. There is, however, a third method of resolving which shows great promise. This is one or the other form of biochemical procedures using selective enzymatic reaction. Thus the DL α-halo propionic acid can be subjected to an asymmetric oxidase or decarboxylase which will, by oxidation or decarboxylation, destroy one form, usually the L, leaving the other unchanged. Even more attractive is the use of a hydrolase on a derivative of the racemic propionic acid to form preferentially one form of the α-halo acid; thus carboxy esters or carboxylates of the α-halo propionic acids can be subjected to an esterase which will selectively saponify one enantiomorph and leave the other unchanged. In practice, we prefer to carry out the resolution of the DL α-halo propionic acid by the formation of salts with optically active bases. Such bases may include such compounds as quinine, brucine, cinchonidine, cinchonine, morphine, quinidine, and strychnine. Preferably, however, the resolution is carried out using quinine, brucine, or strychnine, but especially quinine.

When the resolution is carried out by the preparation of the optically active salt of the α-halo propionic acid, temperatures varying from 0° C. to the boiling point of the solvent may be employed. However, ambient temperatures are preferred. The time of the reaction, which is usually no longer than ½ hour, will be determined by the rate of precipitation of the L α-halo acid salt. This reaction is a normal acid base reaction, which may be carried out by any known means. The precipitated L α-halo salt and the D α-halo salt in the filtrate may then be converted to their respective α-halo propionic acids by any known means (such as the reaction with a dilute aqueous mineral acid). Equivalent amounts of active base and α-halo propionic acid are preferred for this reaction. If it is desired, the D or L salt may be used directly in the following steps without first preparing the free acid.

The extent of possible racemization in step (3) will be determined by the ratio of ammonia to the L α-halo propionic compound. The temperature of the ammonolysis reaction, although not critical, also plays a slight part in the degree of optical activity obtained in the product. Temperatures ranging from +50° C. to −45° C. may be conveniently employed. When ammonia alone is used [step (2)] at temperatures above the boiling point of the ammonia, it is preferred that the ammonolysis be carried out in a sealed vessel. Normally, reactions of this type may require from several hours to several days for completion, depending upon the compounds used and the other reaction conditions employed.

In step (3), a mixture of ammonia-lower alkanol or ammonia-water may be used; however, it is preferred that ammonia-water be used.

Step (4) is used when the starting material is the 3,4-dihydroxy compound or when it is desired to first obtain the 3,4-methoxy or methoxy hydroxy compound with subsequent reaction via steps (5) or (6) to the 3,4-dihydroxy final product. In that event, the reaction mixture from steps (2) or (3) is treated with an excess of dilute aqueous hydrohalic acid (such as hydrochloric acid, hydrobromic acid, and the like), preferably hydrochloric acid. If the ammonia in steps (2) and (3) is not removed prior to acid treatment, an extremely large excess of hydrohalic acid must be used; therefore, it is preferred to react the aminated product with the acid after evaporation of the ammonia. The acid reaction may be run at any suitable temperature (0–100° C.), preferably 15–40° C., but especially at ambient temperatures. Sufficient acid may be used so as to substantially obtain the phenylalanine hydrohalide; however, it is preferred when employing step (4) to evaporate the excess ammonia as well as the alcohol, if present, followed by the addition of a stoichiometric amount of dilute aqueous hydrochloric acid so as to obtain the free amino acid. Upon neutralization, this amino acid will precipitate from the aqueous solution.

In step (6), it is highly preferred to remove the excess ammonia from the product of steps (2) or (3) prior to dealkylation, although it would be possible to dealkylate the ammonia mixture directly. It is to be understood that if the entire reaction mixture from the ammonia-alcohol (or water) step is used for dealkylation, it will be difficult to obtain the proper concentration of hydrohalic acid by solely adding a concentrated hydrohalic acid to the ammonia-alcohol (or water) solution. Therefore, it is preferred to either concentrate the solution first, as indicated below, or treat the aminated material while in the ammonia-water solution with a gaseous hydrohalic acid. (When NH$_3$-alcohol is used, concentration, to remove the alcohol, is necessary.) In this manner, a sufficient quantity of gaseous hydrohalic acid is added so as to easily obtain a concentrated hydrohalic acid reaction mixture for dealkylation. In this step, the aminated residue is treated with a concentrated hydrohalic acid (such as hydrochloric acid, hydrobromic acid, and the like), but preferably greater than 20% hydrochloric acid and especially fortified (35–45%) hydrochloric acid in a sealed vessel. This reaction is run at a temperature above 100° C., preferably above 125° C., but especially 145–165° C. in a sealed vessel until the reaction is substantially complete.

The alternative process for preparing the 3,4-dihydroxy final compounds is indicated in step (5). It is to be understood that this process step is to be used as an alternative dealkylation process. Concentration of the aminated product from steps (2) or (3) prior to acylation is not required, but it is preferred that the excess ammonia is first removed. In the event that the ammonia and/or solvent [step (3)] is not first removed, a sufficient excess of the acylating agent must be used so as to react with the ammonia and/or solvent and also acylate the amino acid compound. The acylation is carried out by any known means, preferably using a lower alkanoic acid anhydride or acid chloride (such as acetic anhydride, propionic anhydride, propionic acid chloride, and acetic acid chloride) or an ar-lower alkanoic acid anhydride and ar-lower alkanoic acid halide (such as phenylacetic anhydride and phenylacetic acid halide), but especially acetic anhydride. (A base, such as pyridine or NaAc is also used.) The solvent for the reaction is generally the acylating agent itself. The dealkylation may be carried out directly upon the acylated reaction mixture, or the acylated compound may be isolated first. The dealkylation is carried out with an aluminum halide, preferably aluminum bromide, in an anhydrous medium (such as benzene, toluene, xylene, and the like) at a temperature of 15° C. to the boiling point of the solvent, preferably at or near the reflux temperature of the solvent. When the dealkylation is carried out upon the acylated mixture containing the excess acylating agent as the solvent, the dealkylated 3,4-position will subsequently be acylated. In any event, whether the acylation be upon the amino group of the molecule or upon the amino group as well as the 3- and/or 4-position, acid hydrolysis by known means (preferably with a hydrohalic acid) is subsequently required to remove the acyl group so as to obtain the α-methyl(3,4-dihydroxyphenyl)-alanine acid addition salt.

Step (7) is carried out when it is desired to obtain the free acids of the salts.

The following examples are used by way of illustration:

EXAMPLE 1

L α-chloro-α-(3-methoxy-4-hydroxybenzyl)-propionic acid (A) L α-chloro-α-(3-methoxy-4-hydroxybenzyl)-propionic acid, quinine salt.—To a solution of 16.2 grams of quinine in 50 ml. of isopropanol is added a solution of 10.6 grams of DL α-chloro-α-(3-methoxy-4-hydroxybenzyl)-propionic acid in 30 ml. of isopropanol at 30° C. After allowing the solution to stand for ½ hour, the precipitate of the quinine salt of the L acid is filtered and washed with (2× 20 ml.) isopropanol and dried.

(B) The cake obtained from Step A is then dissolved in 100 ml. of water and the solution added to a cold (15° C.) mixture of 35.2 ml. of 2.5 N hydrochloric acid in 100 ml. of water. The solution is slurried for one hour. At this point, the L α-chloro acid precipitate is filtered, the cake washed with water, and dried.

When methanol or n-butanol is used in place of isopropanol in Step A, there is obtained L α-chloro-α-(3-methoxy-4-hydroxybenzyl)-propionic acid, quinine salt.

When hydrobromic acid, sulfuric acid, or phosphoric acid is used in place of hydrochloric acid in Step B, there is obtained L α-chloro-α-(3-methoxy-4-hydroxybenzyl)-propionic acid.

EXAMPLE 2

D α-chloro-α-(3-methoxy-4-hydroxybenzyl)-propionic acid

To a solution of 16.2 grams of quinine in 50 ml. of isopropanol is added a solution of 10.6 grams of DL α-chloro-α-(3-methoxy-4-hydroxybenzyl)-propionic acid in 30 ml. of isopropanol at 30° C. After allowing the solution to stand for ½ hour, the mixture is filtered, the filtrate concentrated in vacuo, and the residue diluted with 100 ml. water followed by treatment with 35.2 ml. of 2.5 N hydrochloric acid. After stirring for several minutes, the solution is filtered and the cake washed with (2× 20 ml.) water and dried to obtain D α-chloro-α-(3-methoxy-4-hydroxybenzyl)-propionic acid.

When methanol or n-butanol is used in place of isopropanol, there is obtained D α-chloro-α-(3-methoxy-4-hydroxybenzyl)-propionic acid.

When hydrobromic acid, sulfuric acid, or phosphoric acid is used in place of hydrochloric acid, there is obtained D α-chloro-α-(3-methoxy-4-hydroxybenzyl)-propionic acid.

EXAMPLE 3

L α-chloro-α-(3,4-dihydroxybenzyl)-propionic acid (A) L α-chloro-α-(3,4-dihydroxybenzyl)-propionic acid, strychnine salt.—To a solution of 16.7 grams of strychnine in 50 ml. of n-butanol is added a solution of 10.0 grams of DL α-chloro-α-(3,4-dihydroxybenzyl)-propionic acid in 30 ml. of n-butanol at 5° C. After allowing the solution to stand for 1½ hours, the precipitate of the strychnine salt of the L acid is filtered and washed with (2× 20 ml.) n-butanol and dried.

(B) The cake obtained from Step A is then dissolved in 50 ml. of water and the solution added to a cold (15° C.) mixture of 35.2 ml. of 2.5 N hydrochloric acid in 100 ml. of water. The solution is slurried for one hour, extracted with chloroform, and the chloroform extract concentrated in vacuo to yield a residue of the desired compound.

When methanol or isopropanol is used in place of n-butanol in Step A, there is obtained L α-chloro-α-(3,4-dihydroxybenzyl)-propionic acid, strychnine salt.

When hydrobromic acid, sulfuric acid, or phosphoric acid is used in place of hydrochloric acid in Step B, there is obtained L α-chloro-α-(3,4-dihydroxybenzyl)-propionic acid.

EXAMPLE 4

D α-chloro-α-(3,4-dihydroxybenzyl)-propionic acid

To a solution of 16.7 grams of strychnine in 50 ml. of n-butanol is added a solution of 10.0 grams of DL α-chloro-α-(3,4-dihydroxybenzyl)-propionic acid in 30 ml. of n-butanol at 5° C. After allowing the solution to stand for 1½ hours, the mixture is filtered and the filtrate concentrated in vacuo to a slurry. The slurry is then dissolved in 100 ml. of water, 35.2 ml. of 2.5 N hydrochloric acid added, the solution stirred for an additional 15 minutes, extracted with chloroform, and the chloroform extract concentrated in vacuo to yield a residue of the desired compound.

When methanol or isopropanol is used in place of n-butanol, there is obtained D α-chloro-α-(3,4-dihydroxybenzyl)-propionic acid.

When hydrobromic acid, sulfuric acid, or phosphoric acid is used in place of hydrochloric acid, there is obtained D α-chloro-α-(3,4-dihydroxybenzyl)-propionic acid.

EXAMPLE 5

L α-bromo-α-(3,4-dimethoxybenzyl)-propionic acid (A) L α-bromo-α-(3,4-dimethoxybenzyl)-propionic acid, brucine salt.—To a solution of 19.2 grams of brucine in 50 ml. of ethanol is added a solution of 13.2 grams of DL α-bromo-α-(3,4-dimethoxybenzyl)-propionic acid in 30 ml. of ethanol at 50° C. After allowing the solution to stand for ½ hour, the precipitate of the brucine salt of the L acid is filtered and washed with (2× 20 ml.) ethanol and dried.

(B) The cake obtained from Step A is then dissolved in 100 ml. of water and the solution added to a cold (15° C.) mixture of 35.2 ml. of 2.5 N hydrobromic acid in 100 ml. of water. The solution is slurried for one hour, extracted with chloroform, and the chloroform extract concentrated in vacuo to yield a residue of the desired product.

When isopropanol or n-butanol is used in place of ethanol in Step A, there is obtained L α-bromo-α-(3,4-dimethoxybenzyl)-propionic acid, brucine salt.

When hydrochloric acid, sulfuric acid, or phosphoric acid is used in place of hydrobromic acid in Step B, there is obtained L α-bromo-α-(3,4-dimethoxybenzyl)-propionic acid.

EXAMPLE 6

D α-bromo-α-(3,4-dimethoxybenzyl)-propionic acid

To a solution of 19.2 grams of brucine in 50 ml. of methanol is added a solution of 13.2 grams of DL α-bromo-α-(3,4-dimethoxybenzyl)-propionic acid in 30 ml. of methanol at 50° C. After allowing the solution to stand for ½ hour, it is filtered and the filtrate concentrated in vacuo to a slurry. To the slurry is added 100 ml. of water and 35.2 ml. of 2.5 N hydrobromic acid. The solution is then filtered and the cake treated with (2× 20 ml.) water and dried to obtain D α-bromo-α-(3,4-dimethoxybenzyl)-propionic acid.

When isopropanol or n-butanol is used in place of methanol, there is obtained D α-bromo-α-(3,4-dimethoxybenzyl)-propionic acid.

When hydrochloric acid, sulfuric acid, or phosphoric acid is used in place of hydrobromic acid, there is obtained D α-bromo-α-(3,4-dimethoxybenzyl) - propionic acid.

EXAMPLE 7

L α-methyl-(3,4-dihydroxyphenyl)-alanine·HCl

To 150 ml. of liquid ammonia at −35° C. is added slowly over 15 minutes 6.4 grams of D α-chloro-α-(3,4-dihydroxybenzyl)-propionic acid. After maintaining the solution at −35° C. for 4 days, the liquid ammonia is evaporated. To the residue is added 100 ml. of aqueous 0.5 N hydrochloric acid and the solution is stirred for 15 minutes. The water solution is then concentrated in vacuo to dryness to yield a residue of the desired product.

When the above reaction is run at −33° C. for 6 days instead of −35° C. for 4 days, there is obtained L α-methyl-(3,4-dihydroxyphenyl)-alanine·HCl.

When D α-chloro-α-(3-methoxy-4-hydroxybenzyl)-propionic acid and D α-bromo-α-(3,4-dimethoxybenzyl)-propionic acid, obtained from Examples 2 and 6 respectively, are used in place of D α-chloro-α-(3,4-dihydroxybenzyl)-propionic acid in the above example, there are obtained L α-methyl-(3-methoxy-4-hydroxyphenyl) - alanine·HCl and L α-methyl-(3,4-dimethoxyphenyl)-alanine·HCl respectively.

EXAMPLE 8

L α-methyl-(3,4-dihydroxyphenyl)-alanine·HCl

To a solution of 10.2 grams of ammonia in 200 ml. of ethanol in a sealed vessel at 50° C. is added slowly over 15 minutes 6.4 grams of L α-chloro-α-(3,4-dihydroxybenzyl)-propionic acid. After maintaining the solution at 50° C. for 4 days, the ammonia solution is evaporated. To the residue is added 100 ml. of aqueous 0.5 N hydrochloric acid, and the solution is stirred for 15 minutes. The water solution is then concentrated in vacuo to dryness. The residue is dissolved in 50 ml. of isopropanol, the solution charcoaled, and the product precipitated by the slow addition of ether.

When methanol, propanol, butanol, or water is used in place of the ethanol in the above example, there is obtained L α-methyl-(3,4-dihydroxyphenyl)-alanine·HCl.

When L α-chloro-α-(3-methoxy-4-hydroxybenzyl)-propionic acid and L α-bromo-α-(3,4-dimethoxybenzyl)-propionic acid, obtained from Examples 1 and 5 respectively, are used in place of L α-chloro-α-(3,4-dihydroxybenzyl)-propionic acid in the above example, there are obtained L α-methyl-(3-methoxy-4-hydroxyphenyl) - alanine·HCl and L α-methyl-(3,4-dimethoxyphenyl)-alanine·HCl respectively.

EXAMPLE 9

L α-methyl-(3,4-dihydroxyphenyl)-alanine·HCl

To a solution of 0.6 mole of ammonia in 200 ml. of ethanol at −35° C. is added slowly over 15 minutes 6.8 grams of L α-chloro-α-(3-methoxy-4-hydroxybenzyl)-propionic acid. After maintaining the solution at −35° C. for 4 days, the solution is concentrated in vacuo to a slurry. To the residue is added 140 ml. of 35% hydrochloric acid and the mixture reacted in a sealed tube at 160° C. for 2 hours. The volatiles are removed in vacuo. To this residue is added 50 ml. of isopropanol, the solution charcoaled, and the product precipitated from the filtrate by the slow addition of ether.

When L α-bromo-α-(3,4-dimethoxybenzyl)-propionic acid, obtained from Example 6, is used in place of L α-chloro-α-(3-methoxy-4-hydroxybenzyl)-propionic acid in the above example, there is obtained L α-methyl-(3,4-dihydroxyphenyl)-alanine·HCl.

EXAMPLE 10

L α-methyl-(3,4-dihydroxyphenyl)-alanine·HCl

To 150 ml. of liquid ammonia in a sealed tube at 50° C. is added slowly over 15 minutes 6.8 grams of D α-chloro-α-(3-methoxy-4-hydroxybenzyl)-propionic acid. After maintaining the solution at 50° C. for 4 days, the liquid ammonia is evaporated. To the residue is added 140 ml. of 35% hydrochloric acid and the mixture reacted in a sealed tube at 150° C. for 2 hours. The volatiles are removed in vacuo. To this residue is added 50 ml. of isopropanol, the solution charcoaled, and the product precipitated by the slow addition of ether.

When D α-bromo-α-(3,4-dimethoxybenzyl)-propionic acid is used in place of D α-chloro-α-(3-methoxy-4-hydroxy-benzyl)-propionic acid, there is obtained L α-methyl-(3,4-dihydroxyphenyl)-alanine·HCl.

EXAMPLE 11

L α-methyl-(3-methoxy-4-hydroxyphenyl)-alanine·HCl

To 150 ml. of liquid ammonia at −35° C. is added slowly over 15 minutes 15.8 grams of D α-chloro-α-(3-methoxy-4-hydroxybenzyl)-propionic acid, quinine salt. After maintaining the solution at −35° C. for 4 days, 150 ml. of water are added, the solution filtered, and the filtrate concentrated in vacuo. To the residue is added 100 ml. of aqueous 0.5 N hydrochloric acid, and the solution is stirred for 15 minutes. The water solution is then distilled in vacuo. To the residue is added 50 ml. of isopropanol, the solution charcoaled, and the filtrate treated with ether to precipitate the desired product.

When D α-chloro-α-(3,4-dimethoxybenzyl)-propionic acid, brucine salt and D α-chloro-α-(3,4-dihydroxybenzyl)-propionic acid, strychnine salt are used in place of D α-chloro-α-(3-methoxy-4-hydroxybenzyl)-propionic acid, quinine salt in the above example, there are obtained L α-methyl-(3,4-dimethoxyphenyl)-alanine·HCl and L α-methyl-(3,4-dihydroxyphenyl)-alanine·HCl respectively.

EXAMPLE 12

L α-methyl-(3-methoxy-4-hydroxyphenyl)-alanine·HCl

To a solution of 0.6 mole of ammonia in 200 ml. of ethanol at −35° C. is added slowly over 15 minutes 15.8 grams of L α-chloro-α-(3-methoxy-4-hydroxybenzyl)-propionic acid, quinine salt. After maintaining the solution at −35° C. for 4 days, the solution is concentrated and 150 ml. of $NH_3$·water is added. The solution is filtered and concentrated in vacuo to dryness. To the residue is added 100 ml. of aqueous 0.5 N hydrochloric acid. The acid solution is then concentrated in vacuo. To the residue is added 50 ml. of isopropanol, the solution charcoaled, and ether slowly added to the filtrate to precipitate the product.

When L α-chloro-α-(3,4-dimethoxybenzyl)-propionic acid, brucine salt and L α-chloro-α-(3,4-dihydroxybenzyl)-propionic acid, strychnine salt are used in place of L α-chloro-α-(3-methoxy-4-hydroxybenzyl)-propionic acid, quinine salt in the above example, there are obtained L α-methyl-(3,4-dimethoxyphenyl)-alanine·HCl and L α-methyl-(3,4-dihydroxyphenyl)-alanine·HCl respectively.

EXAMPLE 13

L α-methyl-(3,4-dihydroxyphenyl)-alanine hydrobromide 0.032 mole of L α-methyl-(3-methoxy-4-hydroxyphenyl)-alanine·HCl is refluxed under nitrogen with 140 ml. of 48% hydrobromic acid for 3½ hours. The volatiles are removed in vacuo. To this residue is added 100 ml. of water, and the water is subsequently removed under vacuo. To the residue is added 100 ml. of isopropanol, the solution charcoaled, and ether slowly added to the filtrate to precipitate the desired product.

When L α-methyl-(3,4-dimethoxyphenyl)-alanine·HCl, obtained from Example 8, is used in place of L α-methyl-(3-methoxy-4-hydroxyphenyl)-alanine·HCl in the above example, there is obtained L α-methyl-(3,4-dihydroxyphenyl)-alanine·HBr.

EXAMPLE 14

L α-methyl-(3,4-dihydroxyphenyl)-alanine

To a solution of 0.03 mole of L α-methyl-(3,4-dihydroxyphenyl)-alanine hydrochloride in 250 ml. of secondary butanol is added 10 ml. of propylene oxide. The mixture is aged at 25° C. for 5 hours, and the precipitated amino acid is filtered, washed with water, and dried in vacuo to yield the crude L α-methyl-(3,4-dihydroxyphenyl)-alanine. The crude product is purified by dissolving it in 60 ml. of water saturated with $SO_2$ at 85–90° C. The $SO_2$ solution is treated with 600 mg. of Darco G–60, filtered, and the pure amino acid is precipitated by concentrating the filtrate to ½ volume in vacuo. M.P. 295–298° C.; 11.4% $H_2O$; equiv. wt.=238; $α_{546}$ of the Cu salt=+150.

When butylene oxide or ethylene oxide is used in place of propylene oxide in the above example, there is obtained L α-methyl-(3,4-dihydroxyphenyl)-alanine.

Similarly, when L α - methyl - (3-methoxy-4-hydroxyphenyl)-alanine·HCl and L α-methyl-(3,4-dimethoxyphenyl)-alanine·HCl are used in place of L α-methyl-(3,4-dihydroxyphenyl)-alanine hydrochloride, there are obtained L α - methyl-(3-methoxy-4-hydroxyphenyl)-alanine and L α-methyl-(3,4-dimethoxyphenyl)-alanine respectively.

EXAMPLE 15

L α-methyl-(3,4-dihydroxyphenyl)-alanine

To a solution of 0.03 mole of L α-methyl-(3,4-dihydroxyphenyl)-alanine hydrochloride in 25 ml. of water is cautiously added an aqueous solution of sodium bicarbonate until the pH of the solution is 4.2. The mixture is stirred for 15 minutes, and the precipitated amino acid is filtered, washed with ice water, and dried in vacuo to yield L α-methyl-(3,4-dihydroxyphenyl)-alanine. M.P. 295–298° C.; 11.4% $H_2O$; equiv. wt.=238; $α_{546}$ of the Cu salt=+150.

EXAMPLE 16

L α-methyl-(3,4-dihydroxyphenyl)-alanine·HCl

To 150 ml. of liquid ammonia at −35° C. is added slowly over 15 minutes 6.4 grams of D α-chloro-α-(3-methoxy-4-hydroxybenzyl)-propionic acid. After maintaining the solution at −35° C. for 4 days, the liquid ammonia is evaporated. To the residue is added 12 ml. of acetic anhydride and 5 ml. of pyridine and the mixture heated on a steam bath for 2 hours. The excess acetic anhydride and pyridine are removed under vacuo and the residue is refluxed in a solution of 0.03 mole of aluminum bromide in 100 ml. of absolute benzene. After the reaction has continued for 2½ hours, 15 ml. of iced-oxygen-free water is added and the reaction mixture subsequently concentrated to dryness in a nitrogen atmosphere. To the residue is added 12 ml. of acetic anhydride and 5 ml. of pyridine and the mixture heated on a steam bath for 2 hours. At this point, the solution is cooled and 25 ml. of water are added. The aqueous solution thus obtained is then extracted with (3 × 25 ml.) chloroform. The combined chloroform extracts are evaporated to dryness and the residue placed in a solution of 1.0 mole of hydrochloric acid in 50 ml. of water and the mixture refluxed for 2 hours. The solution is then concentrated to dryness in vacuo and the residue mixed with 100 ml. of isopropanol. The solution is charcoaled and ether slowly added to the filtrate to precipitate the desired product.

When D α-chloro-α-(3,4-dimethoxybenzyl)-propionic acid is used in place of D α-chloro-α-(3-methoxy-4-hydroxybenzyl) - propionic acid, there is obtained L α-methyl-(3,4-dihydroxyphenyl)-alanine·HCl.

EXAMPLE 17

L α-methyl-(3,4-dihydroxyphenyl)-alanine·HCl

To a solution of 0.6 mole of ammonia in 200 ml. of ethanol in a sealed vessel at 50° C. is added slowly over 15 minutes 6.8 grams of L α-chloro-α-(3-methoxy-4-hydroxybenzyl) - propionic acid. After maintaining the solution at 50° C. for 4 days, the solution is concentrated to dryness in vacuo. To the residue is added 12 ml. of acetic anhydride and 5 ml. of pyridine and the mixture heated on a steam bath for 2 hours. The excess acetic anhydride and pyridine are removed under vacuo and the residue is refluxed in a solution of 0.03 mole of aluminum bromide in 100 ml. of absolute benzene. After the reaction has continued for 2½ hours, 15 ml. of iced-oxygen-free water is added and the reaction mixture subsequently concentrated to dryness in a nitrogen atmosphere. To the residue is added 12 ml. of acetic anhydride and 5 ml. of pyridine and the mixture heated on a steam bath for 2 hours. At this point, the solution is cooled and 25 ml. of water are added. The aqueous solution thus obtained is then extracted with (3 × 25 ml.) chloroform. The combined chloroform extracts are evaporated to dryness and the residue placed in a solution of 1.0 mole of hydrochloric acid in 50 ml. of water and the mixture refluxed for 2 hours. The solution is then concentrated to dryness in vacuo and the residue mixed with 100 ml. of isopropanol. The solution is charcoaled and ether slowly added to the filtrate to precipitate the desired product.

When L α-chloro-α-(3,4-dimethoxybenzyl)-propionic acid is used in place of L α-chloro-α-(3-methoxy-4-hydroxybenzyl)-propionic acid, there is obtained L α-methyl-(3,4-dihydroxyphenyl)-alanine·HCl.

EXAMPLE 18

Lα-methyl-(3,4-dihydroxyphenyl)-alanine

To a solution of 0.03 mole of L α-methyl-(3,4-dihydroxylphenyl)-alanine hydrochloride in 25 ml. of water is cautiously added an aqueous solution of ammonium hydroxide to a pH of 4.2. The mixture is stirred under a blanket of nitrogen for 15 minutes and the precipitated amino acid is filtered, washed with ice water, and dried in vacuo to yield L α-methyl-(3,4-dihydroxyphenyl)-alanine. M.P. 295–298° C.; 11.4% H$_2$O; equiv. wt.=238; α$_{546}$ of the Cu salt=+150.

When L α-methyl-(3-methoxy-4-hydroxyphenyl)-alanine hydrochloride and L α-methyl-(3,4-dimethoxyphenyl)-alanine hydrochloride are used in place of L α-methyl-(3,4-dihydroxyphenyl)-alanine hydrochloride in the above example, there are obtained L α-methyl-(3-methoxy-4-hydroxyphenyl)-alanine and L α-methyl-(3,4-dimethoxyphenyl)-alanine respectively.

EXAMPLE 19

L α-methyl-(3,4-hydroxyphenyl)-alanine

To 150 ml. of liquid ammonia in a sealed tube at 50° C. is added slowly over 15 minutes 6.4 grams of D α-chloro-α-(3,4-dihydroxybenzyl)-propionic acid. After maintaining the solution at 50° C. for 4 days, the liquid ammonia is evaporated. To the residue is added 60 ml. of water saturated with SO$_2$ and the solution heated at 85° C. to dissolve the solid. The solution is charcoaled, filtered, and concentrated to ½ the volume to precipitate the desired product. M.P. 295–298° C.; 11.4% H$_2$O; equiv. wt.=238; α$_{546}$ of the Cu salt=+150.

When D α-chloro-α-(3-methoxy-4-hydroxybenzyl)-propionic acid and D α-chloro-α-(3,4-dimethoxybenzyl)-propionic acid are used in place of D α-chloro-α-(3,4-dihydroxybenzyl)-proprionic acid in the above example, there are obtained L α-methyl-(3-methoxy-4-hydroxyphenyl)-alanine and L α-methyl-(3,4-dimethoxyphenyl)-alanine respectively.

EXAMPLE 20

L α-methyl-(3,4-dihydroxyphenyl)-alanine

To a solution of 200 ml. of 3 N ammonium hydroxide at room temperature is added slowly over 15 minutes 6.8 grams of L α-chloro-α-(3,4-dihydroxybenzyl)-propionic acid. After maintaining the solution at room temperature for 4 days, the solution is concentrated in vacuo and to the residue is added 50 ml. of water saturated with SO$_2$. The solution is heated to 85° C. to dissolve the solid, charcoaled, filtered, and the filtrate concentrated to ½ the volume to precipitate the desired product. M.P. 295–298° C.; 11.4% H$_2$O; equiv. wt.=238; α$_{546}$ of the Cu salt=+150.

When L α-chloro-α-(3-methoxy-4-hydroxybenzyl)-propionic acid and L α-chloro-α-(3,4-dimethoxybenzyl)-propionic acid are used in place of L α-chloro-α-(3,4-dihydroxybenzyl)-propionic acid in the above example, there are obtained L α-methyl-(3-methoxy-4-hydroxyphenyl)-alanine and L α-methyl-(3,4-dimethoxyphenyl)-alanine respectively.

We claim:

1. A process for the preparation of L-α-methyl-β-(3,4-dihydroxyphenyl)alanine or the hydrohalide salts thereof which comprises in combination, the following steps:

(a) resolving by means of a base a racemic α-halo compound of structural formula:

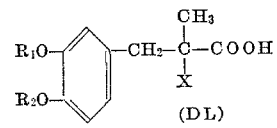

(DL)

wherein R$_1$ and R$_2$ are each selected from the group consisting of hydrogen and methyl; and X is chloro or bromo; into respective D- and L-α-halo acid compounds;

(b) treatment of the L-α-halo acid with at least 2 moles of a solution of ammonia-lower alkanol or ammonia-water solutions until replacement of the halo is substantially compelte followed by treatment with a dilute aqueous hydrohalic acid to produce a compound of structural formula

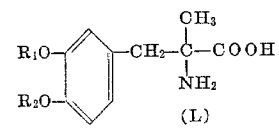

(L)

or its hydrohalide salt wherein R$_1$ and R$_2$ are as defined above;

(c) when at least one of R$_1$ and R$_2$ is methyl, contacting the material obtained from (b) with a concentrated hydrohalic acid at a temperature between about 100° C. and about 165° C. to dealkylate and form the hydrohalic acid addition salt of L-α-methyl-(3,4-dihydroxyphenyl)alanine.

2. A modification of the process claimed in claim 1, wherein the D-α-halo acid produced in step (a) is treated with at least 2 moles of substantially pure ammonia until replacement of the halo is substantially complete, followed by treatment with a hydrohalic acid to produce a compound of structural formula:

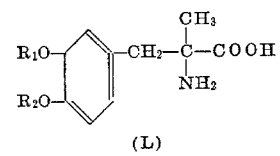

(L)

or its hydrohalide salt, wherein R$_1$ and R$_2$ are as defined in claim 1.

3. The process as claimed in claim 2, wherein the D-α-halo acid is treated with at least 2 moles of substantially pure ammonia at −35 to −30° C.

4. A modification of the process as claimed in claim 1, wherein the compound of structural formula

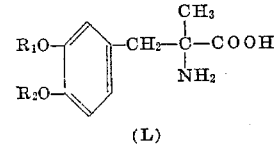

(L)

or its hydrohalide salt, [from step (b)], when at least one of R$_1$ and R$_2$ is methyl, is treated with an acylating agent selected from a lower alkanoic anhydride, lower alkanoic acid halide, phenyl-lower alkanoic acid anhydride and phenyl-lower alkanoic acid halide to form the corresponding N-acyl-phenylalanine compound, subsequently admixing this acylated compound with an aluminum halide and treating the material thus obtained with a dilute hydrohalic acid to form L-α-methyl-(3,4-dihydroxyphenyl)alanine acid addition salt.

5. A modification of the process as claimed in claim 2, wherein the compound of structural formula

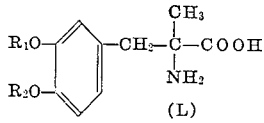

or its hydrohalide salt, when at least one of $R_1$ and $R_2$ is methyl, is treated with an acylating agent selected from a lower alkanoic anhydride, lower alkanoic acid halide, phenyl-lower alkanoic acid anhydride and phenyl-lower alkanoic acid halide to form the corresponding N-acyl-phenylalanine compound, subsequently admixing this acylated compound with an aluminum halide and treating the material thus obtained with a dilute hydrohalic acid to form L-α-methyl-(3,4-dihydroxyphenyl)alanine acid addition salt.

6. The process as claimed in claim 1 wherein the compound of structural formula

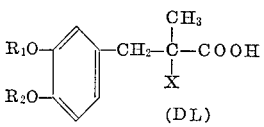

wherein $R_1$, $R_2$ and X are as defined in claim 1, is resolved by treatment with an optically active base selected from the group consisting of quinine, brucine, cinchonidine, cinconine, morphine, quinidine and strychnine, in a lower alkanol followed by separation of the L- and D-salts, and treatment of each salt separately with a dilute hydrohalic acid to obtain the L- and D-isomer respectively or its hydrohalide salt.

7. The process as claimed in claim 6, wherein the optically active base is selected from the group consisting of quinine, brucine, or strychnine the solvent is a lower alkanol and the hydrohalic acid is hydrochloric acid.

8. The process as claimed in claim 6, wherein the optically active base is quinine and the hydrohalic acid is hydrochloric acid.

9. The process as claimed in claim 1 wherein the demethylation of step (c) is conducted in concentrated hydrochloric acid.

10. The process as claimed in claim 4 wherein the acylation is conducted with a lower alkanoic acid anhydride, and the demethylation is conducted with aluminum bromide at a temperature between about 75° C. to about 106° C., and the deacylation is conducted with dilute hydrochloric acid.

11. A process as claimed in claim 10, wherein the lower alkanoic acid anhydride is acetic anhydride, and the dealkylation with aluminum bromide is conducted at a temperature between about 75° C. to about 106° C.

12. A process as claimed in claim 11, wherein the free base is obtained by treating the acid addition salt obtained with propylene oxide in acetone.

13. The process as claimed in claim 1, wherein $R_1$ is methyl, $R_2$ is hydrogen, and X is chloro.

14. The process as claimed in claim 2, wherein $R_1$ is methyl, and $R_2$ is hydrogen.

15. The process as claimed in claim 4, wherein $R_1$ is methyl and $R_2$ is hydrogen.

16. The process as claimed in claim 5, wherein $R_1$ is methyl and $R_2$ is hydrogen.

17. The process as claimed in claim 6, wherein $R_1$ is methyl, $R_2$ is hydrogen and X is chloro.

18. A modification of the process as claimed in claim 1 wherein the hydrohalic acid addition salt obtained in step (b) is treated with a lower alkylene oxide in an inert solvent selected from the group consisting of a lower alkyl ketone, lower alkyl ether and lower alkanol to obtain L-α-methyl-3,4-dihydroxyphenyl)alanine.

19. The process as claimed in claim 18, wherein the lower alkylene oxide is propylene oxide, and the solvent is selected from the group consisting of a lower alkyl ketone, and a lower alkanol.

20. A modification of the process as claimed in claim 1, wherein the hydrohalic acid addition salt obtained in step (c) is treated with a lower alkylene oxide in an inert solvent selected from the group consisting of a lower alkyl ketone, lower alkyl ether and lower alkanol to obtain L-α-methyl-(3,4-dihydroxyphenyl)alanine.

21. The process as claimed in claim 20, wherein the lower alkylene oxide is propylene oxide, and the solvent is selected from the group consisting of a lower alkyl ketone and a lower alkanol.

22. A modification of the process as claimed in claim 1, wherein the hydrohalic acid addition salt obtained in step (b) is treated with a base selected from the group consisting of an alkali metal base, and ammonia to obtain L-α-methyl-(3,4-dihydroxyphenyl)alanine.

23. A modification of the process as claimed in claim 1, wherein the hydrohalic acid addition salt obtained in step (c) is treated with a base selected from the group consisting of an alkali metal base, and ammonia to obtain L-α-methyl-(3,4-dihydroxyphenyl)alanine.

References Cited

UNITED STATES PATENTS 3,366,679   1/1968   Reinhold et al. _____ 260—519

OTHER REFERENCES

Organic Chemistry, by Finar, vol. I (1963), p. 566 relied on.

Chemistry of the Amino Acids, by Greenstein et al., vol. I (1961), pub. John Wiley and Sons, Inc., pp. 718–721 relied on.

Noller, C. R.: Chemistry of Organic Compounds (1951), published by W. B. Saunders Company, p. 226 relied on.

Packer, J. et al.: A Modern Approach to Organic Chemistry (1958), published by The Clarenden Press, Oxford, pp. 144 and 145 relied on.

LORRAINE A. WEINBERGER, Primary Examiner

L. A. THAXTON, Assistant Examiner

U.S. Cl. X.R.

260—473, 521, 999